United States Patent
Saeed et al.

(10) Patent No.: US 11,603,756 B2
(45) Date of Patent: Mar. 14, 2023

(54) DOWNHOLE WIRELESS COMMUNICATION

(71) Applicants: Saudi Arabian Oil Company, Dhahran (SA); WIRELESS INSTRUMENTATION SYSTEMS AS, Trondheim (NO)

(72) Inventors: Abubaker Saeed, Dhahran (SA); Jarl André Fellinghaug, Leinstrand (NO); Vegard Fiksdal, Trondheim (NO); Alexey Prusakov, Trondheim (NO)

(73) Assignees: SAUDI ARABIAN OIL COMPANY, Dhahran (SA); WIRELESS INSTRUMENTATION SYSTEMS AS, Trondheim (NO)

( * ) Notice: Subject to any disclaimer, the term of this patent is extended or adjusted under 35 U.S.C. 154(b) by 77 days.

(21) Appl. No.: 17/190,748

(22) Filed: Mar. 3, 2021

(65) Prior Publication Data

US 2022/0282616 A1    Sep. 8, 2022

(51) Int. Cl.
*E21B 47/13* (2012.01)
*H04W 4/12* (2009.01)
(Continued)

(52) U.S. Cl.
CPC ............ *E21B 47/13* (2020.05); *H04L 67/125* (2013.01); *H04W 4/12* (2013.01); *H04W 4/20* (2013.01)

(58) Field of Classification Search
CPC .......... E21B 47/13; E21B 47/18; E21B 47/12; H04L 67/125; H04L 27/38; H04W 4/12; H04W 4/20; G01V 11/002
See application file for complete search history.

(56) References Cited

U.S. PATENT DOCUMENTS

| 2,643,723 A | 6/1953 | Lynes |
| 3,175,618 A | 3/1965 | Lang et al. |

(Continued)

FOREIGN PATENT DOCUMENTS

| CN | 101592475 | 12/2009 |
| CN | 201496028 | 6/2010 |

(Continued)

OTHER PUBLICATIONS

Bao et al., "Recent development in the distributed fiber optic acoustic and ultrasonic detection," Journal of Lightwave Technology, Aug. 15, 2017, 35:16 (3256-3267), 12 pages.

(Continued)

*Primary Examiner* — Adnan Aziz
(74) *Attorney, Agent, or Firm* — Fish & Richardson P.C.

(57) ABSTRACT

Downhole equipment and surface equipment communicate wirelessly with each other. A signal wirelessly transmitted at a first frequency from a downhole controller disposed within a wellbore is received at a surface location. The received signal is demodulated to a demodulated digital value. The demodulated value is added to an end of a buffer string. The buffer string is processed to determine whether the buffer string contains a message that is valid. In response to determining that the buffer string contains the message that is valid, the message is decoded. A command signal is wirelessly transmitted at a second frequency different from the first frequency to the downhole controller to adjust a state of the downhole controller.

15 Claims, 6 Drawing Sheets

(51) Int. Cl.
*H04W 4/20* (2018.01)
*H04L 29/08* (2006.01)
*H04L 67/125* (2022.01)

(56) References Cited

U.S. PATENT DOCUMENTS

| | | | |
|---|---|---|---|
| 3,448,305 A | 6/1969 | Raynal et al. | |
| 3,558,936 A | 1/1971 | Horan | |
| 3,663,845 A | 5/1972 | Apstein | |
| 3,916,999 A | 11/1975 | Ellis et al. | |
| 3,918,520 A | 11/1975 | Hutchison | |
| 3,970,877 A | 7/1976 | Russell et al. | |
| 4,387,318 A | 6/1983 | Kolm et al. | |
| 4,536,674 A | 8/1985 | Schmidt | |
| 4,685,521 A | 8/1987 | Raulins | |
| 4,685,523 A | 8/1987 | Paschal, Jr. et al. | |
| 5,092,176 A | 3/1992 | Buttram et al. | |
| 5,113,379 A | 5/1992 | Scherbatskoy | |
| 5,150,619 A | 9/1992 | Turner | |
| 5,215,151 A | 6/1993 | Smith et al. | |
| 5,224,182 A | 6/1993 | Murphy et al. | |
| 5,301,760 A | 4/1994 | Graham | |
| 5,317,223 A | 5/1994 | Kiesewetter et al. | |
| 5,375,622 A | 12/1994 | Houston | |
| 5,503,228 A | 4/1996 | Anderson | |
| 5,566,762 A | 10/1996 | Braddick et al. | |
| 5,613,555 A | 3/1997 | Sorem et al. | |
| 5,708,500 A | 1/1998 | Anderson | |
| 5,738,173 A | 4/1998 | Burge et al. | |
| 5,892,860 A | 4/1999 | Maron et al. | |
| 5,965,964 A | 10/1999 | Skinner et al. | |
| 5,975,205 A | 11/1999 | Carisella | |
| 6,044,906 A | 4/2000 | Saltel | |
| 6,068,015 A | 5/2000 | Pringle | |
| 6,082,455 A | 7/2000 | Pringle et al. | |
| 6,193,079 B1 | 2/2001 | Weimer | |
| 6,209,652 B1 | 4/2001 | Portman et al. | |
| 6,349,768 B1 | 2/2002 | Leising | |
| 6,504,258 B2 | 1/2003 | Schultz et al. | |
| 6,578,638 B2 | 6/2003 | Guillory et al. | |
| 6,588,266 B2 | 7/2003 | Tubel et al. | |
| 6,728,165 B1 | 4/2004 | Roscigno et al. | |
| 6,768,214 B2 | 7/2004 | Schultz et al. | |
| 6,779,601 B2 | 8/2004 | Wilson | |
| 6,913,079 B2 | 7/2005 | Tubel | |
| 6,920,085 B2 | 7/2005 | Finke et al. | |
| 7,086,481 B2 | 8/2006 | Hosie et al. | |
| 7,199,480 B2 | 4/2007 | Fripp et al. | |
| 7,224,077 B2 | 5/2007 | Allen | |
| 7,242,103 B2 | 7/2007 | Tips | |
| 7,249,805 B2 | 7/2007 | Cap | |
| 7,345,372 B2 | 3/2008 | Roberts et al. | |
| 7,347,261 B2 | 3/2008 | Markel et al. | |
| 7,397,388 B2 | 7/2008 | Huang et al. | |
| 7,410,003 B2 | 8/2008 | Ravensbergen et al. | |
| 7,668,411 B2 | 2/2010 | Davies et al. | |
| 7,847,421 B2 | 12/2010 | Gardner et al. | |
| 7,906,861 B2 | 3/2011 | Guerrero et al. | |
| 7,946,341 B2 | 5/2011 | Hartog et al. | |
| 7,980,309 B2 | 7/2011 | Crawford | |
| 8,047,232 B2 | 11/2011 | Bemitsas | |
| 8,258,644 B2 | 9/2012 | Kaplan | |
| 8,408,064 B2 | 4/2013 | Hartog et al. | |
| 8,421,251 B2 | 4/2013 | Pabon et al. | |
| 8,426,988 B2 | 4/2013 | Hay | |
| 8,493,556 B2 | 7/2013 | Li et al. | |
| 8,564,179 B2 | 10/2013 | Ochoa et al. | |
| 8,604,634 B2 | 12/2013 | Pabon et al. | |
| 8,638,002 B2 | 1/2014 | Lu | |
| 8,648,480 B1 | 2/2014 | Liu et al. | |
| 8,681,000 B2 | 3/2014 | August et al. | |
| 8,749,400 B2* | 6/2014 | Robbins | G01V 11/002 340/855.7 |
| 8,786,113 B2 | 7/2014 | Tinnen et al. | |
| 8,851,192 B2 | 10/2014 | Deible et al. | |
| 8,916,983 B2 | 12/2014 | Marya et al. | |
| 8,925,649 B1 | 1/2015 | Wiebe et al. | |
| 8,941,384 B2 | 1/2015 | Prammer | |
| 8,948,550 B2 | 2/2015 | Li et al. | |
| 9,026,376 B2 | 5/2015 | Volker et al. | |
| 9,091,144 B2 | 7/2015 | Swanson et al. | |
| 9,106,159 B1 | 8/2015 | Wiebe et al. | |
| 9,130,161 B2 | 9/2015 | Nair et al. | |
| 9,140,815 B2 | 9/2015 | Lopez et al. | |
| 9,170,149 B2 | 10/2015 | Hartog et al. | |
| 9,239,043 B1 | 1/2016 | Zeas | |
| 9,321,222 B2 | 4/2016 | Childers et al. | |
| 9,322,389 B2 | 4/2016 | Tosi | |
| 9,499,460 B2 | 11/2016 | Kawamura et al. | |
| 9,574,420 B2 | 2/2017 | Hall et al. | |
| 9,581,489 B2 | 2/2017 | Skinner | |
| 9,599,460 B2 | 3/2017 | Wang et al. | |
| 9,599,505 B2 | 3/2017 | Lagakos et al. | |
| 9,617,847 B2 | 4/2017 | Jaaskelainen et al. | |
| 9,625,603 B2* | 4/2017 | Stolpman | G01V 3/34 |
| 9,638,671 B2 | 5/2017 | Borigo et al. | |
| 9,759,556 B2 | 9/2017 | Davis et al. | |
| 9,784,077 B2 | 10/2017 | Gorrara | |
| 9,803,976 B2 | 10/2017 | Simonetti et al. | |
| 9,903,172 B2 | 2/2018 | Hansen | |
| 10,115,942 B2 | 10/2018 | Qiao et al. | |
| 10,174,611 B2* | 1/2019 | Stolpman | E21B 47/20 |
| 10,209,383 B2 | 2/2019 | Barfoot et al. | |
| 10,253,615 B2 | 4/2019 | Hunter et al. | |
| 10,367,434 B2 | 7/2019 | Ahmad | |
| 10,724,312 B2 | 7/2020 | Zsolt | |
| 10,844,672 B2 | 11/2020 | Dziekonski | |
| 10,934,814 B2 | 3/2021 | Arsalan et al. | |
| 2002/0043404 A1 | 4/2002 | Trueman et al. | |
| 2004/0156264 A1* | 8/2004 | Gardner | H04L 27/2601 367/81 |
| 2005/0274527 A1 | 12/2005 | Misselbrook et al. | |
| 2006/0042792 A1 | 3/2006 | Connell | |
| 2006/0086498 A1 | 4/2006 | Wetzel et al. | |
| 2007/0012437 A1 | 1/2007 | Clingman et al. | |
| 2007/0181304 A1 | 8/2007 | Rankin et al. | |
| 2008/0048455 A1 | 2/2008 | Carney | |
| 2008/0100828 A1 | 5/2008 | Cyr et al. | |
| 2008/0277941 A1 | 11/2008 | Bowles | |
| 2008/0296067 A1 | 12/2008 | Haughom | |
| 2009/0107725 A1 | 4/2009 | Christy et al. | |
| 2009/0166045 A1 | 7/2009 | Wetzel et al. | |
| 2010/0164231 A1 | 7/2010 | Tsou | |
| 2010/0308592 A1 | 12/2010 | Frayne | |
| 2011/0049901 A1 | 3/2011 | Tinnen | |
| 2011/0088462 A1 | 4/2011 | Samson et al. | |
| 2011/0273032 A1 | 11/2011 | Lu | |
| 2012/0018143 A1 | 1/2012 | Lembcke | |
| 2012/0211245 A1 | 8/2012 | Fuhst et al. | |
| 2012/0274477 A1* | 11/2012 | Prammer | E21B 49/00 340/853.7 |
| 2012/0292915 A1 | 11/2012 | Moon | |
| 2013/0068481 A1 | 3/2013 | Zhou | |
| 2013/0091942 A1 | 4/2013 | Samson et al. | |
| 2013/0119669 A1 | 5/2013 | Murphree | |
| 2013/0128697 A1 | 5/2013 | Contant et al. | |
| 2013/0167628 A1 | 7/2013 | Hull et al. | |
| 2013/0200628 A1 | 8/2013 | Kane | |
| 2013/0227940 A1 | 9/2013 | Greenblatt | |
| 2013/0231787 A1* | 9/2013 | Chapman | E21B 44/00 700/282 |
| 2014/0153369 A1* | 6/2014 | van Zelm | E21B 47/16 367/82 |
| 2014/0167418 A1 | 6/2014 | Hiejima | |
| 2014/0175800 A1 | 6/2014 | Thorp | |
| 2014/0284937 A1 | 9/2014 | Dudley et al. | |
| 2014/0311737 A1 | 10/2014 | Bedouet et al. | |
| 2015/0053009 A1 | 2/2015 | Yan et al. | |
| 2015/0060083 A1 | 3/2015 | Romer et al. | |
| 2015/0114127 A1 | 4/2015 | Barfoot et al. | |
| 2015/0318920 A1 | 11/2015 | Johnston | |
| 2016/0168957 A1 | 6/2016 | Tubel | |
| 2016/0177659 A1 | 6/2016 | Voll et al. | |
| 2016/0273947 A1 | 9/2016 | Mu et al. | |

(56) References Cited

U.S. PATENT DOCUMENTS

| | | |
|---|---|---|
| 2017/0033713 A1 | 2/2017 | Petroni |
| 2017/0075029 A1 | 3/2017 | Cuny et al. |
| 2017/0235006 A1 | 8/2017 | Ellmauthaler et al. |
| 2017/0260846 A1 | 9/2017 | Jin et al. |
| 2018/0045543 A1 | 2/2018 | Farhadiroushan et al. |
| 2018/0052041 A1 | 2/2018 | Yaman et al. |
| 2018/0155991 A1 | 6/2018 | Arsalan et al. |
| 2018/0252096 A1 | 9/2018 | Switzer et al. |
| 2018/0274311 A1 | 9/2018 | Zsolt |
| 2018/0351480 A1 | 12/2018 | Ahmad |
| 2019/0025095 A1 | 1/2019 | Steel |
| 2019/0049054 A1 | 2/2019 | Gunnarsson |
| 2019/0052374 A1 | 2/2019 | Lie et al. |
| 2019/0055792 A1 | 2/2019 | Sui et al. |
| 2019/0128113 A1 | 5/2019 | Ross et al. |
| 2019/0253003 A1 | 8/2019 | Ahmad |
| 2019/0253004 A1 | 8/2019 | Ahmad |
| 2019/0253005 A1 | 8/2019 | Ahmad |
| 2019/0253006 A1 | 8/2019 | Ahmad |
| 2019/0376371 A1 | 12/2019 | Arsalan |
| 2020/0270983 A1 | 8/2020 | Hallunbaek et al. |
| 2020/0300083 A1 | 9/2020 | Fellinghaug et al. |
| 2021/0285315 A1* | 9/2021 | Coley ............... E21B 44/00 |

FOREIGN PATENT DOCUMENTS

| | | |
|---|---|---|
| CN | 102471701 | 5/2012 |
| CN | 101488805 | 8/2012 |
| CN | 103913186 | 7/2014 |
| CN | 105043586 | 11/2015 |
| CN | 107144339 | 9/2017 |
| CN | 206496768 | 9/2017 |
| CN | 105371943 | 6/2018 |
| CN | 108534910 | 9/2018 |
| DE | 202012103729 | 10/2012 |
| EP | 0380148 | 8/1990 |
| GB | 2218721 | 11/1989 |
| JP | 2010156172 | 7/2010 |
| WO | WO 1993006331 | 4/1993 |
| WO | WO 2009046709 | 4/2009 |
| WO | WO 2014116458 | 7/2014 |
| WO | WO 2015073018 | 5/2015 |
| WO | WO 2016111849 | 7/2016 |
| WO | WO 2016130620 | 8/2016 |
| WO | WO 2017146593 | 8/2017 |
| WO | WO 2018125071 | 7/2018 |
| WO | WO 2018145215 | 8/2018 |

OTHER PUBLICATIONS

Bybee et al., "Through-Tubing Completions Maximize Production," SPE-0206-0057, Society of Petroleum Engineers (SPE), Drilling and Cementing Technology, JPT, Feb. 2006, 2 pages.

Chen et al., "Distributed acoustic sensor based on two-mode fiber," Optics Express 25399, Optics Express, Sep. 2018, 26:19, 9 pages.

Cox et al., "Realistic Assessment of Proppant Pack Conductivity for Material Section," SPE-84306-MS, Society of Petroleum Engineers (SPE), presented at the Annual Technical Conference, Oct. 5-8, 2003, 12 pages.

Fornarelli et al., "Flow patterns and heat transfer around six in-line circular cylinders at low Reynolds number," JP Journal of Heat and Mass Transfer, Pushpa Publishing House, Allahabad, India, Feb. 2015, 11:1 (1-28), 28 pages.

Gillard et al., "A New Approach to Generating Fracture Conductivity," SPE-135034-MS, Society of Petroleum Engineers (SPE), presented at the SPE Annual Technical Conference and Exhibition, Sep. 19-22, 2010, 14 pages.

Gomaa et al., "Computational Fluid Dynamics Applied To Investigate Development and Optimization of Highly Conductive Channels within the Fracture Geometry," SPE-179143-MS, Society of Petroleum Engineers (SPE), SPE Production & Operations, 32:04, Nov. 2017, 12 pages.

Gomaa et al., "Improving Fracture Conductivity by Developing and Optimizing a Channels Within the Fracture Geometry: CFD Study," SPE-178982-MS, Society of Petroleum Engineers (SPE), SPE International Conference and Exhibition on Formation Damage Control, Feb. 24-26, 2016, 25 pages.

Govardhan et al., "Critical mass in vortex-induced vibration of a cylinder," European Journal of Mechanics B/Fluids, Jan.-Feb. 2004, 23:1 (17-27), 11 pages.

Huthwaite, "Evaluation of inversion approaches for guided wave thickness mapping," Proceedings of the Royal Society A, Mar. 2014, 470:20140063, 28 pages.

Huthwaite, "Improving accuracy through density correction in guided wave tomography," Proceedings of the Royal Society A, Jan. 2016, 472:20150832, 25 pages.

Juarez and Taylor, "Field test of a distributed fiber-optic intrusion sensor system for long perimeters," Applied Optics, Apr. 10, 2007, 46:11 (1968-1971), 4 pages.

Keiser, "Optical fiber communications," McGraw Hill, 2008, 26-57, 16 pages.

Kern et al., "Propping Fractures With Aluminum Particles," SPE-1573-G-PA, Society of Petroleum Engineers (SPE), Journal of Per. Technology, Jun. 1961, 13:6 (583-589), 7 pages.

Meyer et al., "Theoretical Foundation and Design Formulae for Channel and Pillar Type Propped Fractures—A Method to Increase Fracture Conductivity," SPE-170781-MS, Society Of Petroleum Engineers (SPE), presented at the SPE Annual Technical Conference and Exhibition, Amsterdam, The Netherlands, Oct. 27-29, 2014, 25 pages.

Palisch et al., "Determining Realistic Fracture Conductivity and Understanding its Impact on Well Performance—Theory and Field Examples," SPE-106301-MS, Society of Petroleum Engineers (SPE), presented at the 2007 SPE Hydraulic Fracturing Technology Conference, College Station, Texas, Jan. 29-31, 2007, 13 pages.

petrowiki.spe.org (online), "Scale Problems in Production," available on or before Jan. 15, 2018, retrieved on Feb. 16, 2021, retrieved from URL <https://petrowiki.spe.org/Scale_problems_in_production>, 15 pages.

Poollen et al., "Hydraulic Fracturing—FractureFlow Capacity vs Well Productivity," SPE-890-G, Society of Petroleum Engineers (SPE), presented at 32nd Annual Fall Meeting of Society of Petroleum Engineers, Oct. 6-9, 1957, published as Petroleum Transactions AIME 213, 1958, 5 pages.

Poollen, "Productivity vs Permeability Damage in Hydraulically Produced Fractures," Paper 906-2-G, American Petroleum Institute, presented at Drilling and Production Practice, Jan. 1, 1957, 8 pages.

Qin et al., "Signal-to-Noise Ratio Enhancement Based on Empirical Mode Decomposition in Phase-Sensitive Optical Time Domain Reflectometry Systems," Sensors, MDPI, Aug. 14, 2017, 17:1870, 10 pages.

Rao et al., "Guided Wave Tomography Based on Full Waveform Inversion," IEEE Transactions on Ultrasonics, Ferroelectrics and Frequency Control, May 2016, 63:5, 9 pages.

Rao et al., "Guided Wave Tomography Based on Full Waveform Inversion," Manuscript, The School of Mechanical and Aerospace Engineering, Nanyang Technology University, Feb. 26, 2016, 33 pages.

Saeed et al., "Innovative Permanent Down-Hole Scale and Corrosion Monitoring System Using Ultrasound Guided Waves Technology," SPE-198609-MS, Society of Petroleum Engineers (SPE), presented at the SPE Gas & Oil Technology Showcase and Conference, Dubai, UAE, Oct. 21-23, 2019, 10 pages.

Stalford et al., "Literature Survey and Background Studies Report (Task V)," Document No. 10121.4504.01.01, Intelligent Casing-Intelligent Formation Telemetry (ICIFT) System, Research Partnership of Secure Energy for America (RPSEA), Jul. 15, 2014, 90 pages.

Tinsley and Williams, "A new method for providing increased fracture conductivity and improving stimulation results," SPE-4676-PA, Society of Petroleum Engineers (SPE), Journal of Petroleum Technology, Nov. 1975, 27:11 (1319-1325), 7 pages.

Vincent, "Examining Our Assumptions—Have Oversimplifications Jeopardized our Ability To Design Optimal Fracture Treatments," SPE-119143-MS, Society of Petroleum Engineers (SPE), presented

(56) References Cited

OTHER PUBLICATIONS at the SPE Hydraulic Fracturing Technology Conference, the Woodlands, Texas, Jan. 19-21, 2009, 51 pages.

Vincent, "Five Things You Didn't Want to Know about Hydraulic Fractures," ISRM-ICHF-2013-045, presented at the International Conference for Effective and Sustainable Hydraulic Fracturing: An ISRM specialized Conference, May 20-22, 2013, 14 pages.

Vysloukh, "Chapter 8: Stimulated Raman Scattering," in Nonlinear Fiber Optics, 1990, 298-302, 5 pages.

Walker et al., "Proppants, We Still Don't Need No Proppants—A Perspective of Several Operators," SPE-38611-MS, Society of Petroleum Engineers (SPE), presented at the SPE Annual Technical Conference and Exhibition, San Antonio, Texas, Sep. 27-30, 1995, 8 pages.

Wang et al., "Rayleigh scattering in few-mode optical fibers," Scientific reports, Oct. 2016, 6:35844 (1-8), 8 pages.

wikipedia.org [online] "Cyclic redundancy check," available on or before Jan. 1, 2019, via Internet Archive: Wayback Machine URL <http://web.archive.org/web/20190108021616/https://en.wikipedia.org/wiki/Cyclic_redundancy_check>, retrieved on Jun. 2, 2021, URL <https://en.wikipedia.org/wiki/Cyclic_redundancy_check>, 15 pages.

Williams, "A new method for providing increased fracture conductivity and improving stimulation results," SPE-4676-PA, Journal of Petroleum Technology, vol. 27, No. 11, MO 1975, (1319-1325).

Yamate et al., "Optical sensors for the exploration of oil and gas," Journal of Lightwave Technology, Aug. 15, 2017, 35:16 (3538-3545), 8 pages.

PCT International Search Report and Written Opinion in International Appln. No. PCT/US2022/018294, dated May 31, 2022, 14 pages.

* cited by examiner

AUX (4 BIT) | POTENTIAL MESSAGE (? BIT)

AUX=1 | TENSION (10 BIT) | CRC (8 BIT)

AUX=2 | CT PRESSURE (13 BIT) | BH PRESSURE (13 BIT) | TENSION (10 BIT) | CRC (8 BIT)

AUX=3 | CT PRESSURE (13 BIT) | BH PRESSURE (13 BIT) | TEMPERATURE (7 BIT) | PUMP RATE (6 BIT) | CRC (8 BIT)

AUX=4 | CT PRESSURE (13 BIT) | BH PRESSURE (13 BIT) | TEMPERATURE (7 BIT) | PUMP RATE (6 BIT) | TENSION (10 BIT) | CRC (8 BIT)

FIG. 3B

DOWNHOLE WIRELESS COMMUNICATION

TECHNICAL FIELD

This disclosure relates to surface to downhole wireless communication.

BACKGROUND

Downhole communication involves communication between surface equipment disposed at or above a surface of the wellbore and downhole equipment disposed within the wellbore. For example, a signal can be transmitted from surface equipment to downhole equipment. For example, a signal can be transmitted from downhole equipment to surface equipment. The communication can be completed via a wired connection (for example, a wireline) or via a wireless connection. Downhole communication can also involve communication between two different equipment located downhole. Downhole communication can allow for safe and efficient well operations.

SUMMARY

This disclosure describes technologies relating to downhole wireless communication. Certain aspects of the subject matter described can be implemented as a method (for example, a computer-implemented method). A signal wirelessly transmitted at a first frequency from a downhole controller disposed within a wellbore is received at a surface location. The received signal is demodulated to a demodulated digital value. The demodulated value is added to an end of a buffer string. The buffer string is processed to determine whether the buffer string contains a message that is valid. In response to determining that the buffer string contains the message that is valid, the message is decoded.

This, and other aspects, can include one or more of the following features.

In some implementations, a command signal is wirelessly transmitted at a second frequency different from the first frequency to the downhole controller to adjust a state of the downhole controller.

In some implementations, processing the buffer string to determine whether the buffer string contains a message that is valid includes extracting a cyclic redundancy check field string and an auxiliary field string from the buffer string. In some implementations, processing the buffer string to determine whether the buffer string contains a message that is valid includes determining that the auxiliary field string translates to a first valid state of a plurality of valid states. In some implementations, processing the buffer string to determine whether the buffer string contains a message that is valid includes determining a respective, predetermined bit string length associated with the first valid state in response to determining that the auxiliary field string translates to the first valid state. In some implementations, processing the buffer string to determine whether the buffer string contains a message that is valid includes calculating a checksum of a portion of the buffer string having the respective, predetermined bit string length associated with the first valid state in response to determining the respective, predetermined bit string length associated with the first valid state. In some implementations, processing the buffer string to determine whether the buffer string contains a message that is valid includes determining that the calculated checksum matches the cyclic redundancy check field string.

In some implementations, decoding the message includes, in response to determining that the calculated checksum matches the cyclic redundancy check field string, decoding the portion of the buffer string into the message. In some implementations, the message is stored in a storage medium, and the buffer string is emptied in response to decoding the message. In some implementations, the message is displayed at a surface location.

In some implementations, at least one of the plurality of valid states is a RUN IN HOLE state associated with a predetermined bit string length of 21 bits. In some implementations, at least one of the plurality of valid states is a TRACTOR state associated with a predetermined bit string length of 47 bits. In some implementations, at least one of the plurality of valid states is a CIRCULATE state associated with a predetermined bit string length of 50 bits.

Certain aspects of the subject matter described can be implemented as a system. The system includes a downhole controller and a surface controller. The downhole controller is configured to be disposed within a wellbore. The downhole controller includes a downhole processor and a downhole computer-readable storage medium coupled to the downhole processor. The downhole computer-readable storage medium stores programming instructions for execution by the downhole processor. The programming instructions instruct the downhole processor to perform operations including wirelessly transmitting, at a first frequency, a signal representing a state of the downhole controller. The surface controller is communicatively coupled to the downhole controller. The surface controller includes a surface processor and a surface computer-readable storage medium coupled to the surface processor. The surface computer-readable storage medium stores programming instructions for execution by the surface processor. The programming instructions instruct the surface processor to perform operations including receiving the signal from the downhole controller, demodulating the signal to a demodulated digital value, appending the demodulated digital value to a buffer string, processing the buffer string to determine whether the buffer string contains a message that is valid, and decoding the message in response to determining that the buffer string contains the message that is valid.

This, and other aspects, can include one or more of the following features.

In some implementations, the programming instructions instruct the surface processor to perform operations including wirelessly transmitting, at a second frequency different from the first frequency, a command signal to the downhole controller to adjust the state of the downhole controller in response to determining that the buffer string contains the message that is valid.

In some implementations, processing the buffer string to determine whether the buffer string contains a message that is valid includes extracting a cyclic redundancy check field string and an auxiliary field string from the buffer string. In some implementations, processing the buffer string to determine whether the buffer string contains a message that is valid includes determining that the auxiliary field string translates to a first valid state of a plurality of valid states. In some implementations, processing the buffer string to determine whether the buffer string contains a message that is valid includes determining a respective, predetermined bit string length associated with the first valid state in response to determining that the auxiliary field string translates to the first valid state. In some implementations, processing the buffer string to determine whether the buffer string contains a message that is valid includes calculating a checksum of a portion of the buffer string having the respective, predetermined bit string length associated with the first valid state in response to determining the respective, predetermined bit string length associated with the first valid state. In some implementations, processing the buffer string to determine whether the buffer string contains a message that is valid includes determining that the calculated checksum matches the cyclic redundancy check field string.

In some implementations, the programming instructions stored by the surface computer-readable storage medium instructs the surface processor to perform operations comprising decoding the message in response to determining that the buffer string contains the message that is valid. In some implementations, decoding the message includes, in response to determining that the calculated checksum matches the cyclic redundancy check field string, decoding the portion of the buffer string into the message.

In some implementations, the programming instructions stored by the surface computer-readable storage medium instructs the surface processor to perform operations including storing the message in the surface computer-readable storage medium in response to decoding the message, displaying the message at a surface location, and/or emptying the buffer string.

In some implementations, at least one of the plurality of valid states is a RUN IN HOLE state associated with a predetermined bit string length of 21 bits. In some implementations, at least one of the plurality of valid states is a TRACTOR state associated with a predetermined bit string length of 47 bits. In some implementations, at least one of the plurality of valid states is a CIRCULATE state associated with a predetermined bit string length of 50 bits.

Certain aspects of the subject matter described can be implemented as a system. The system includes a bottomhole assembly and a surface controller. The bottomhole assembly is configured to be disposed within a wellbore. The bottomhole assembly includes a downhole controller. The downhole controller includes a downhole processor and a downhole computer-readable storage medium coupled to the downhole processor. The downhole computer-readable storage medium stores programming instructions for execution by the downhole processor. The programming instructions instruct the downhole processor to perform operations including wirelessly transmitting, at a first frequency, a signal representing a state of the downhole controller and adjusting the state of the bottomhole assembly in response to receiving a command signal. The surface controller is communicatively coupled to the downhole controller. The surface controller includes a surface processor and a surface computer-readable storage medium coupled to the surface processor. The surface computer-readable storage medium stores programming instructions for execution by the surface processor. The programming instructions instruct the surface processor to perform operations including receiving the signal from the downhole controller, demodulating the signal to a demodulated digital value, appending the demodulated digital value to a buffer string, processing the buffer string to determine whether the buffer string contains a message that is valid, and decoding the message in response to determining that the buffer string contains the message that is valid.

This, and other aspects, can include one or more of the following features.

In some implementations, processing the buffer string to determine whether the buffer string contains a message that is valid includes extracting a cyclic redundancy check field string and an auxiliary field string from the buffer string. In some implementations, processing the buffer string to determine whether the buffer string contains a message that is valid includes determining that the auxiliary field string translates to a first valid state of a plurality of valid states. In some implementations, processing the buffer string to determine whether the buffer string contains a message that is valid includes determining a respective, predetermined bit string length associated with the first valid state in response to determining that the auxiliary field string translates to the first valid state. In some implementations, processing the buffer string to determine whether the buffer string contains a message that is valid includes calculating a checksum of a portion of the buffer string having the respective, predetermined bit string length associated with the first valid state in response to determining the respective, predetermined bit string length associated with the first valid state. In some implementations, processing the buffer string to determine whether the buffer string contains a message that is valid includes determining that the calculated checksum matches the cyclic redundancy check field string.

In some implementations, the programming instructions stored by the surface computer-readable storage medium instructs the surface processor to perform operations including, in response to determining that the calculated checksum matches the cyclic redundancy check field string, decoding the portion of the buffer string into the message.

In some implementations, the programming instructions stored by the surface computer-readable storage medium instructs the surface processor to perform operations including storing the message in the surface computer-readable storage medium in response to decoding the message, displaying the message at a surface location, and/or emptying the buffer string.

In some implementations, the programming instructions stored by the surface computer-readable storage medium instructs the surface processor to perform operations including wirelessly transmitting, at a second frequency different from the first frequency, the command signal to the downhole controller to control the bottomhole assembly in response to determining that the buffer string contains the message that is valid.

The details of one or more implementations of the subject matter of this disclosure are set forth in the accompanying drawings and the description. Other features, aspects, and advantages of the subject matter will become apparent from the description, the drawings, and the claims.

DESCRIPTION OF DRAWINGS

FIG. 3B is a schematic diagram of example buffer strings that can be transmitted from downhole equipment to surface equipment and translated by surface equipment.

DETAILED DESCRIPTION

This disclosure describes downhole wireless communication. Some well operations, such as well intervention, require data (sometimes in the form of command signals) to be communicated downhole to a tool string disposed within a wellbore. Some examples of methods of such downhole communication include the use of a wired connection, pressure of flow fluctuations in a circulation fluid, and pulling or pushing of coiled tubing. Wireless communication can be preferred in some cases, such as acid stimulation in multilateral wells. The systems and methods described in this disclosure include a surface controller and a downhole controller that communicate wirelessly with each other. The surface and downhole controllers operate at different frequencies to establish a duplex communication link. The downhole controller actively transmits signals to the surface controller, while the surface controller normally operates at an idle (waiting) state until it receives a valid message from the downhole controller. In response to receiving a valid message from the downhole controller, the surface controller transmits a command signal to the downhole controller to adjust a state of the downhole controller to perform a well operation, such as running a tool in hole, circulate fluid in a well, or actuating a tractor in the well.

The subject matter described in this disclosure can be implemented in particular implementations, so as to realize one or more of the following advantages. The systems and methods described are non-intrusive and do not negatively interfere with well operations, such as well intervention. The systems and methods described can be implemented to perform wireless communication from surface equipment to downhole equipment over long distances, for example, distances of greater than 20,000 feet. The systems and methods described can be implemented to optimize the available bandwidth for wireless communication between downhole and surface equipment. In well intervention operations, various information may be needed at the surface to safely and successfully perform a job, depending on the steps in the job program. In conventional downhole communication schemes (for example, wired communication) sensor data would be transmitted continuously at a desired communication rate. However, as wireless communication methods can be inherently slower, it can be desirable to be more selective on what data is transmitted in order to achieve the desired communication rate. By implementing various downhole states, such as run in hole (RIH), TRACTOR, and CIRCULATE, communication bandwidth and speed can be optimized. The systems and methods described can be implemented to continuously demodulate the messages at the surface for all known valid states to be able to determine the current state of downhole equipment.

Figure 1:
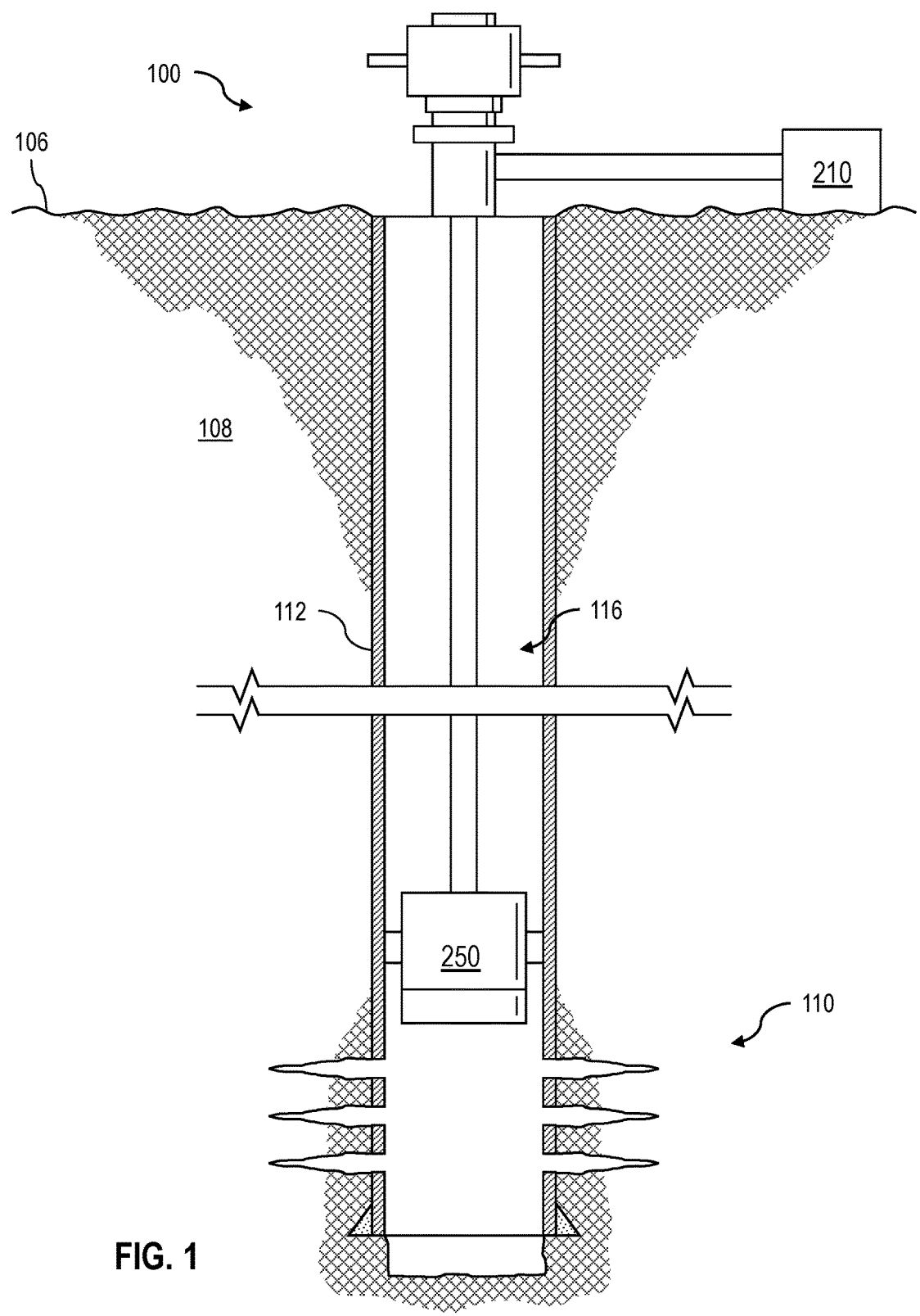
FIG. 1 is a schematic diagram of an example well including an example wireless communication system.

FIG. 1 depicts an example well 100 constructed in accordance with the concepts herein. The well 100 extends from the surface 106 through the Earth 108 to one more subterranean zones of interest 110 (one shown). The well 100 enables access to the subterranean zones of interest 110 to allow recovery (that is, production) of fluids to the surface 106 (represented by flow arrows in FIG. 1) and, in some implementations, additionally or alternatively allows fluids to be placed in the Earth 108. In some implementations, the subterranean zone 110 is a formation within the Earth 108 defining a reservoir, but in other instances, the zone 110 can be multiple formations or a portion of a formation. The subterranean zone can include, for example, a formation, a portion of a formation, or multiple formations in a hydrocarbon-bearing reservoir from which recovery operations can be practiced to recover trapped hydrocarbons. In some implementations, the subterranean zone includes an underground formation of naturally fractured or porous rock containing hydrocarbons (for example, oil, gas, or both). In some implementations, the well can intersect other types of formations, including reservoirs that are not naturally fractured. For simplicity's sake, the well 100 is shown as a vertical well, but in other instances, the well 100 can be a deviated well with a wellbore deviated from vertical (for example, horizontal or slanted), the well 100 can include multiple bores forming a multilateral well (that is, a well having multiple lateral wells branching off another well or wells), or both.

In some implementations, the well 100 is a gas well that is used in producing hydrocarbon gas (such as natural gas) from the subterranean zones of interest 110 to the surface 106. While termed a "gas well," the well need not produce only dry gas, and may incidentally or in much smaller quantities, produce liquid including oil, water, or both. In some implementations, the well 100 is an oil well that is used in producing hydrocarbon liquid (such as crude oil) from the subterranean zones of interest 110 to the surface 106. While termed an "oil well," the well not need produce only hydrocarbon liquid, and may incidentally or in much smaller quantities, produce gas, water, or both. In some implementations, the production from the well 100 can be multiphase in any ratio. In some implementations, the production from the well 100 can produce mostly or entirely liquid at certain times and mostly or entirely gas at other times. For example, in certain types of wells it is common to produce water for a period of time to gain access to the gas in the subterranean zone. The concepts herein, though, are not limited in applicability to gas wells, oil wells, or even production wells, and could be used in wells for producing other gas or liquid resources or could be used in injection wells, disposal wells, or other types of wells used in placing fluids into the Earth.

As shown in FIG. 1, system 200 can be implemented to establish downhole wireless communication. The system 200 includes a surface controller 210 and a downhole controller 250 disposed within the well 100. The surface controller 210 and the downhole controller 250 communicate wirelessly with each other. The system 200 is described in more detail later. The wellbore of the well 100 is typically, although not necessarily, cylindrical. All or a portion of the wellbore is lined with a tubing, such as casing 112. The casing 112 connects with a wellhead at the surface 106 and extends downhole into the wellbore. The casing 112 operates to isolate the bore of the well 100, defined in the cased portion of the well 100 by the inner bore 116 of the casing 112, from the surrounding Earth 108. The casing 112 can be formed of a single continuous tubing or multiple lengths of tubing joined (for example, threadedly) end-to-end. In FIG. 1, the casing 112 is perforated in the subterranean zone of interest 110 to allow fluid communication between the subterranean zone of interest 110 and the bore 116 of the casing 112. In some implementations, the casing 112 is omitted or ceases in the region of the subterranean zone of interest 110. This portion of the well 100 without casing is often referred to as "open hole."

The wellhead defines an attachment point for other equipment to be attached to the well 100. For example, FIG. 1 shows well 100 being produced with a Christmas tree attached to the wellhead. The Christmas tree includes valves used to regulate flow into or out of the well 100. In particular, casing 112 is commercially produced in a number of common sizes specified by the American Petroleum Institute (the "API"), including 4½, 5, 5½, 6, 6⅝, 7, 7⅝, 7¾, 8⅝, 8¾, 9⅝, 9¾, 9⅞, 10¾, 11¾, 11⅞, 13⅜, 13½, 13⅝, 16, 18⅝, and 20 inches, and the API specifies internal diameters for each casing size.

Figure 2:
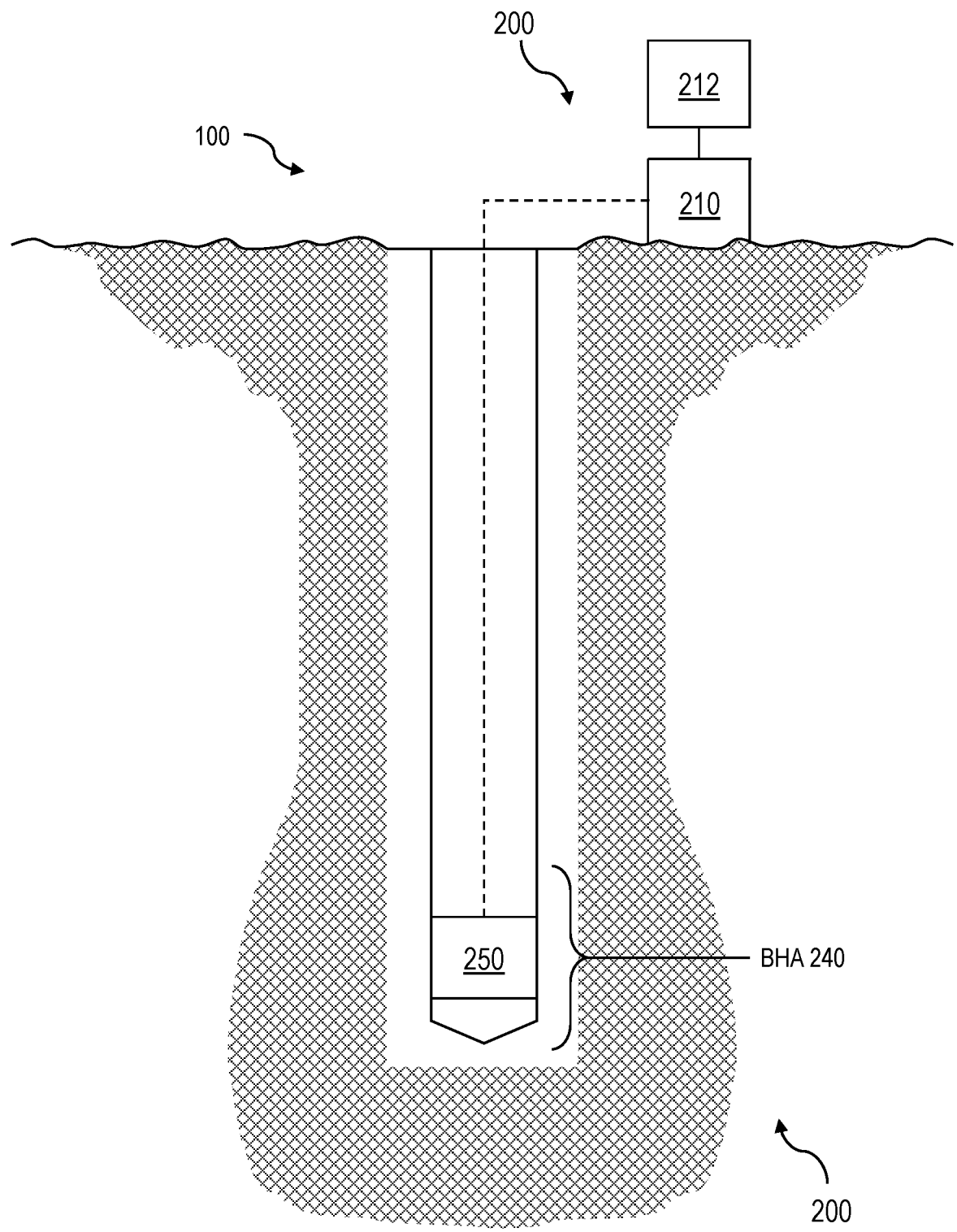
FIG. 2 is a schematic diagram of an example system for wireless communication between surface and downhole equipment.

FIG. 2 is a schematic diagram of an example system 200 for wireless communication between surface and downhole equipment. The system 200 can be implemented in relation to the well 100. In some implementations, the system 200 includes a bottomhole assembly 240 which includes the downhole controller 250. The system 200 includes the surface controller 210 that is communicatively coupled to the downhole controller 250. In some implementations, the surface controller 210 is connected to the downhole controller 250 by a coiled tubing. In some implementations, the surface controller 210 and the downhole controller 250 communicate with each other, for example, via low frequency electromagnetic telemetry or pressure pulses (such as fluidic communication).

The surface controller 210 includes a surface processor and a surface computer-readable storage medium coupled to the surface processor. The surface computer-readable storage medium stores programming instructions for execution by the surface processor, and the programming instructions instruct the surface processor to perform operations. In some implementations, the surface controller 210 is coupled to a display 212 at a surface location. The downhole controller 250 can be disposed in a wellbore (such as the wellbore of well 100) and includes a downhole processor and a downhole computer-readable storage medium coupled to the downhole processor. The downhole computer-readable storage medium stores programming instructions for execution by the downhole processor, and the programming instructions instruct the downhole processor to perform operations. An example of the surface controller 210 and the downhole controller 250 is provided in FIG. 4 and is described in more detail later.

Figure 3A:
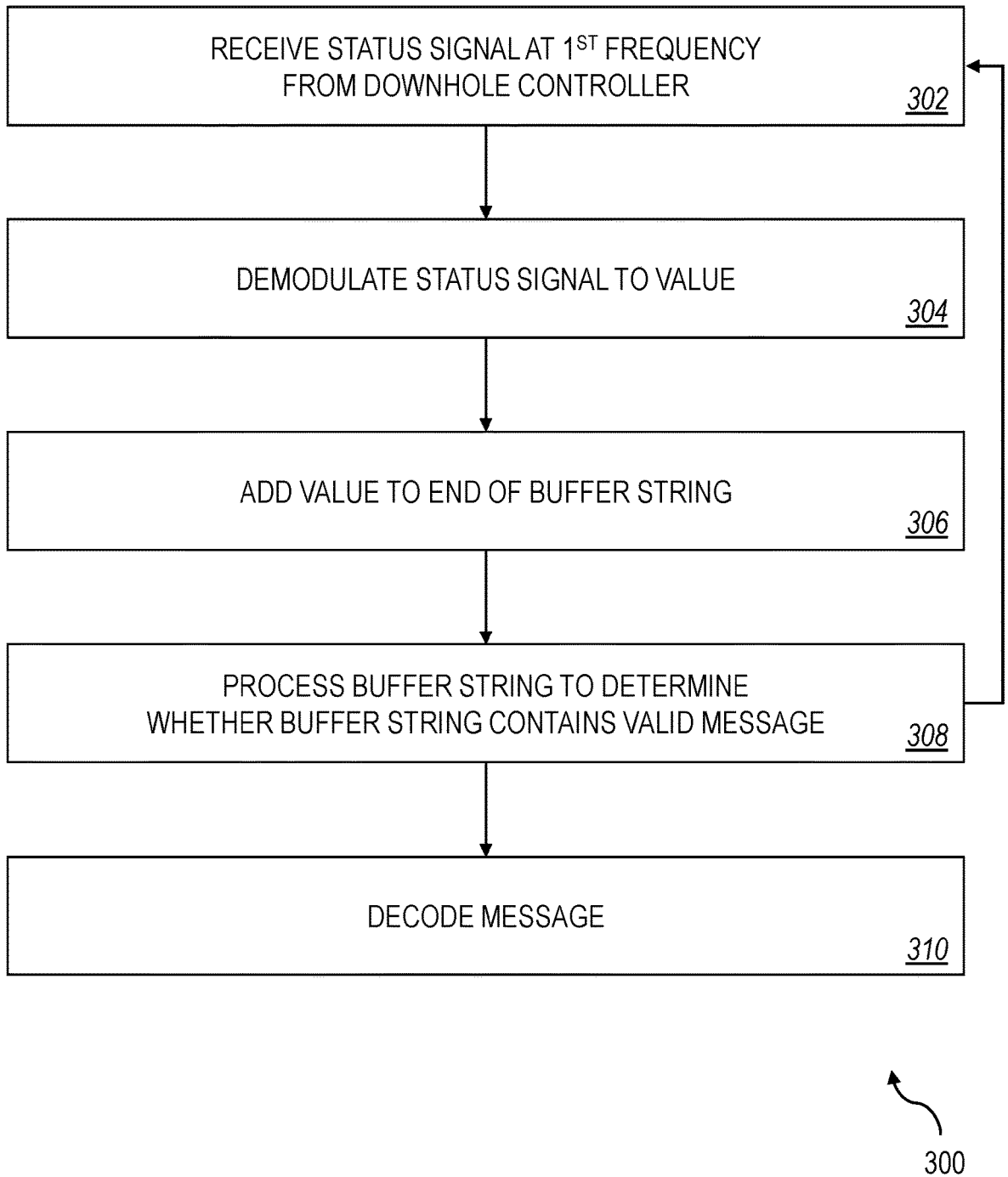
FIG. 3A is a flow chart of an example method for wireless communication between surface and downhole equipment.

FIG. 3A is a flow chart of an example method 300 for wireless communication between surface and downhole equipment. The method 300 can be implemented, for example, by the system 200. At step 302, a status signal wirelessly transmitted at a first frequency from a downhole controller (such as the downhole controller 250) disposed within a wellbore (such as that of well 100) is received at a surface location (for example, by the surface controller 210 located at the surface 106). In some implementations, the first frequency is in a range of from about 2 hertz (Hz) to about 100 Hz.

At step 304, the status signal (received at step 302) is demodulated to a demodulated digital value. For example, at step 304, the status signal is demodulated to a bit (0 or 1).

At step 306, the demodulated value by is added to an end of a buffer string.

At step 308, the buffer string is processed to determine whether the buffer string contains a message that is valid. In some implementations, processing the buffer string at step 308 includes extracting a cyclic redundancy check (CRC) field string and an auxiliary field string from the buffer string. The cyclic redundancy check field string and the auxiliary field string each are associated with a known, predetermined bit string lengths. In some implementations, the known, predetermined bit string lengths associated with the cyclic redundancy check field string and the auxiliary field string are the same bit string length. In some implementations, the known, predetermined bit string lengths associated with the cyclic redundancy check field string and the auxiliary field string are different bit string lengths. For example, the cyclic redundancy check field string is an 8-bit CRC associated with a first, predetermined bit string length of 8 bits, and the auxiliary field string is associated with a second, predetermined bit string length of 4 bits. The first, predetermined bit string length (associated with the cyclic redundancy check field string) determines the bit string length of the checksum, which can be converted to a decimal value. The cyclic redundancy check field string can be any typical CRC, such as an 8-bit CRC, 16-bit CRC, 32-bit CRC, or 64-bit CRC. A CRC is called an n-bit CRC when its checksum value is n-bits (first, predetermined bit string length).

In some implementations, a remaining portion of the buffer string (excluding the cyclic redundancy check field string and the auxiliary field string) is considered the data string. In some implementations, the buffer string comprises, in order from right to left, the cyclic redundancy check field string, the auxiliary field string, and the data string. For example, for a buffer string that is 32 bits in length, starting from the right: the first 8 bits are attributed to the cyclic redundancy check field string, the subsequent 4 bits are attributed to the auxiliary field string, and the remaining 20 bits are attributed to the data string. In some implementations, the buffer string comprises, in order from right to left, the cyclic redundancy check field string, the data string, and the auxiliary field string. For example, for a buffer string that is 32 bits in length, starting from the right: the first 8 bits are attributed to the cyclic redundancy check field string, the subsequent 20 bits are attributed to the data string, and the remaining 4 bits are attributed to the auxiliary field string.

In some implementations, processing the buffer string at step 308 includes determining that the auxiliary field string translates to one of multiple valid states. The second, predetermined bit string length (associated with the auxiliary field string) determines the total number of states that can be represented by the auxiliary field string. For example, if the second, predetermined bit string length is 4 bits, then the auxiliary field string can be converted to a decimal (integer) value in a range of from 0 to 15, meaning there are a total of 16 possible states that can be represented by the auxiliary field string. In some cases, only a portion of the total possible states are considered "valid" states while the remaining portion are considered "invalid" states. For example, auxiliary field strings that convert to decimal values of 1, 2, 3, and 4 are valid states while the remaining states (that convert to 0, 5, 6, 7, 8, 9, 10, 11, 12, 13, 14, and 15) are invalid states. In some implementations, each of the valid states is associated with a respective, predetermined bit string length. In some implementations, the predetermined bit string lengths associated with the valid states are all different, such that each of the valid states can be uniquely identified. For example, one of the valid states is the auxiliary field string converted to a decimal value of 1 for a RUN IN HOLE state associated with a predetermined bit string length of 21 bits. For example, another one of the valid states is the auxiliary field string converted to a decimal value of 2 for a TRACTOR state associated with a predetermined bit string length of 47 bits. For example, another one of the valid states is the auxiliary field string converted to a decimal value of 3 for a CIRCULATE state associated with a predetermined bit string length of 50 bits. For example, another one of the valid states is the auxiliary field string converted to a decimal value of 4 for an AUX state associated with a predetermined bit string length of 60 bits. Each of the valid states (for example, RUN IN HOLE) have a unique structure of bits, whereas a main downhole parameter of interest, for example, can be a tension and compression measurement on a tool string of a downhole portion of the system 200 (for example, the bottomhole assembly 240). In some implementations, the target resolution of the measurement is 9 bits, resulting in a total bit string length (including the cyclic redundancy check field string of 8 bits and the auxiliary field string of 4 bits) is 21 bits. The valid states can include additional states that are typically encountered in well operations. Some additional examples of valid states include SETTING for setting downhole equipment, RELEASING for releasing downhole equipment, SHIFT for sliding sleeve valves, FRAC for fracturing operations, LOGGING for logging reservoir conditions, PERFORATING for perforating casing and/or tubing for enabling fluid communication, and CLEAN OUT for cleaning out of hole. An example of the received buffer string and some examples of the buffer string identified as having valid states are shown in FIG. 3B. As shown in FIG. 3B, the message can include downhole measurement data, such as pressure data, temperature data, tension data, and compression data. The CT pressure can be a pressure measured within a coiled tubing. The BH pressure can be a pressure measured within a borehole of a well (for example, a bottomhole pressure of the well 100).

Referring back to FIG. 3A, in some implementations, processing the buffer string at step 308 includes, in response to determining that the auxiliary field string translates to one of the valid states, determining the predetermined bit string length associated with the respective valid state. For example, processing the buffer string at step 308 includes, in response to determining that the auxiliary field string translates to the TRATOR state, determining the predetermined bit string length of 47 bits associated with the TRACTOR state.

In some implementations, processing the buffer string at step 308 includes calculating a checksum of a portion of the buffer string having the predetermined bit string length of the respective valid state in response to determining the predetermined bit string length associated with the respective valid state. For example, processing the buffer string at step 308 includes, in response to determining the predetermined bit string length of 47 bits associated with the TRACTOR state, calculating a checksum of a portion of the buffer string (such as the data string) having the predetermined bit string length of 47 bits associated with the TRACTOR state.

In some implementations, processing the buffer string at step 308 includes determining that the calculated checksum matches the cyclic redundancy check field string. In some implementations, the downhole controller 250 takes a message payload (for example, the data string) as a number, performs a polynomic division on the number, converts a remainder resulting from the division to the cyclic redundancy check field string, and transmits the cyclic redundancy check field string along with the data string to the surface controller 210. In some implementations, the surface controller 210 performs the same polynomic division on the information received from the downhole controller 250 and compares the remainder with the received cyclic redundancy check field string. If the remainder calculated by the surface controller 210 matches the decimal value of the cyclic redundancy check field string (transmitted from the downhole controller 250), then the buffer string contains a valid message. If it is determined at step 308 that the buffer string contains a valid message, the method 300 proceeds to step 310. If it is determined at step 308 that the buffer string does not contain a valid message, the method 300 cycles back to step 302.

In response to determining that the buffer string contains a valid message at step 308, the message is decoded at step 310. For example, the message decoded at step 310 is a message representing the current state of the downhole system (for example, including the bottomhole assembly 240) in relation to actuating a tractor, running a tool in hole, or circulating fluids in the wellbore. In some implementations, the decoded message is stored in a storage medium (for example, the storage medium of the surface controller 210). In some implementations, the decoded message is displayed at a surface location. In some implementations, the buffer string is emptied in response to decoding the message at step 310.

In some implementations, a command signal is wirelessly transmitted at a second frequency that is different from the first frequency to the downhole controller 250 to adjust a state of the downhole controller 250. For example, the command signal is wirelessly transmitted at the second frequency by the surface controller 210 to the downhole controller 250. In some implementations, the second frequency is in a range of from about 0.01 Hz to about 2 Hz. For example, the command signal instructs the downhole controller 250 to perform a downhole operation in relation to actuating a tractor, running a tool in hole, or circulating fluids in the wellbore, depending on the decoded message including one of the valid states. For example, the command signal instructs the downhole controller 250 to change a state of the downhole controller 250 in relation to actuating a tractor, running a tool in hole, or circulating fluids in the wellbore, depending on the decoded message. In some implementations, steps 302, 304, 306, 308, and 310 are implemented by the surface controller 210. Some of the steps (for example, step 302) can involve interaction with the downhole controller 250.

Figure 3C:
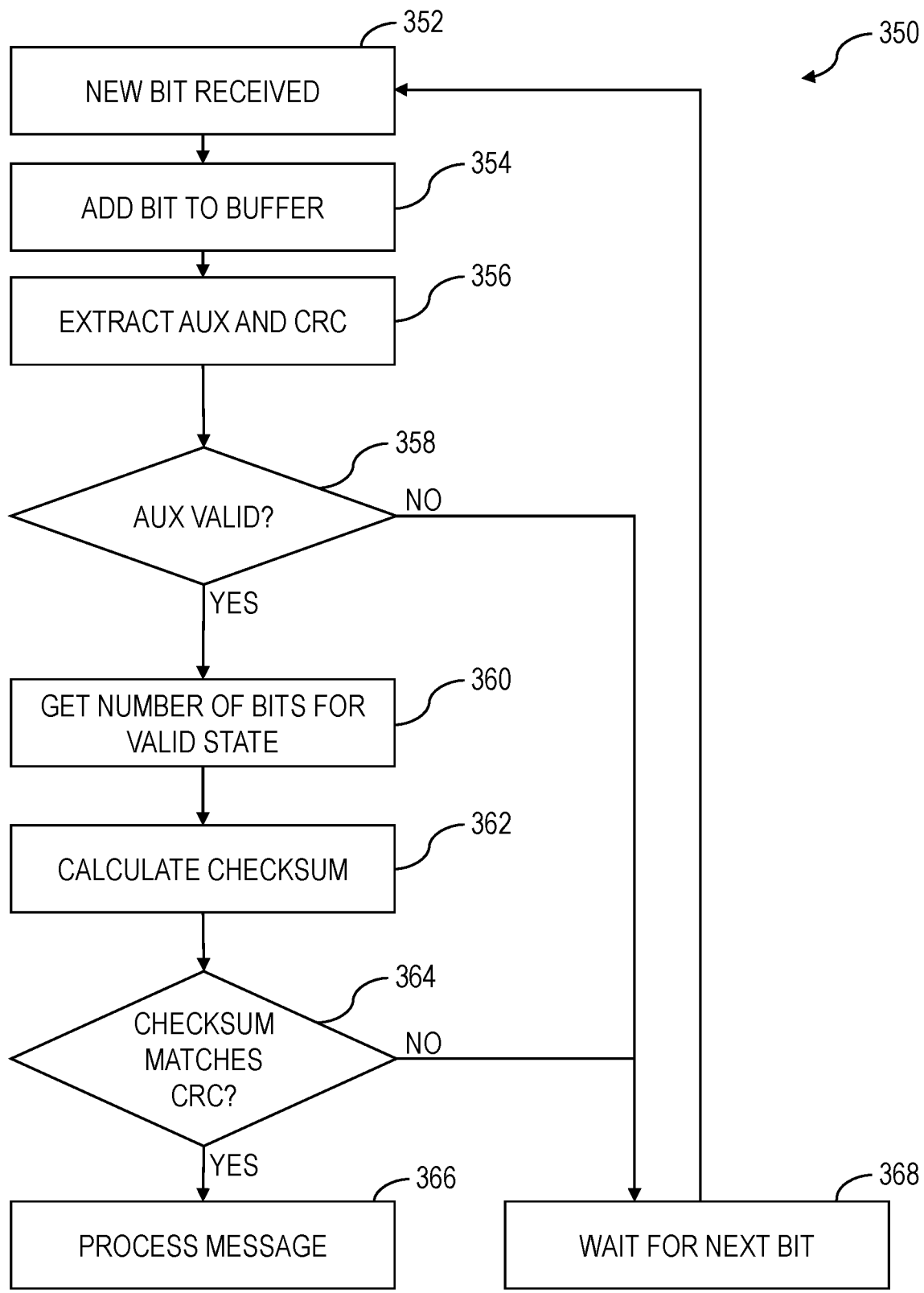
FIG. 3C is a flow chart of an example method for wireless communication between surface and downhole equipment.

FIG. 3C is a flow chart of an example method 350 for wireless communication between surface and downhole equipment. The method 350 can be implemented, for example, by the system 200. At step 352 a bit (for example, transmitted by the downhole controller 250 at a first frequency) is received (for example, by the surface controller 210). In some implementations, step 352 of method 350 corresponds to steps 302 and 304 of method 300.

At step 354, the bit received at step 352 is added to an end of a buffer. In some implementations, step 354 of method 350 corresponds to step 306 of method 300.

At step 356, an auxiliary field string and a cyclic redundancy check field string are extracted from the buffer. At step 358, it is determined whether the auxiliary field string translates to a valid state. If the auxiliary field string translates to a valid state at step 358, the method 350 proceeds to step 360, where the bit string length associated with the valid state (determined at step 358) is determined. If the auxiliary field string does not translate to a valid state at step 358, the method 350 proceeds to step 368, where the method 350 cycles back to step 352. At step 362, a checksum value is calculated from a portion of the bit string length in the buffer determined at step 360 following the auxiliary field string. At step 364, it is determined whether the cyclic redundancy check field string matches the checksum value calculated at step 362. If the cyclic redundancy check field string matches the checksum value (calculated at step 362) at step 364, the method 350 proceeds to step 366, where the message is processed from the portion of the bit string length in the buffer determined at step 360 following the auxiliary field string. In some implementations, steps 356, 358, 360, 362, 364, and 366 correspond to steps 308 and 310 of method 300.

If the cyclic redundancy check field string does not match the checksum value (calculated at step 362) at step 364, the method 350 proceeds to step 368, where the method 350 cycles back to step 352. In some implementations, steps 352, 354, 356, 358, 360, 362, 364, 366, and 368 are implemented by the surface controller 210. Some of the steps (for example, steps 352 and 368) involve interaction with the downhole controller 250. In some implementations, step(s) of method 300 can be combined with step(s) of method 350. For example, the system 200 (surface controller 210 and downhole controller 250 communicating with each other) can implement any combination of steps of method 300 and steps of method 350.

Figure 4:
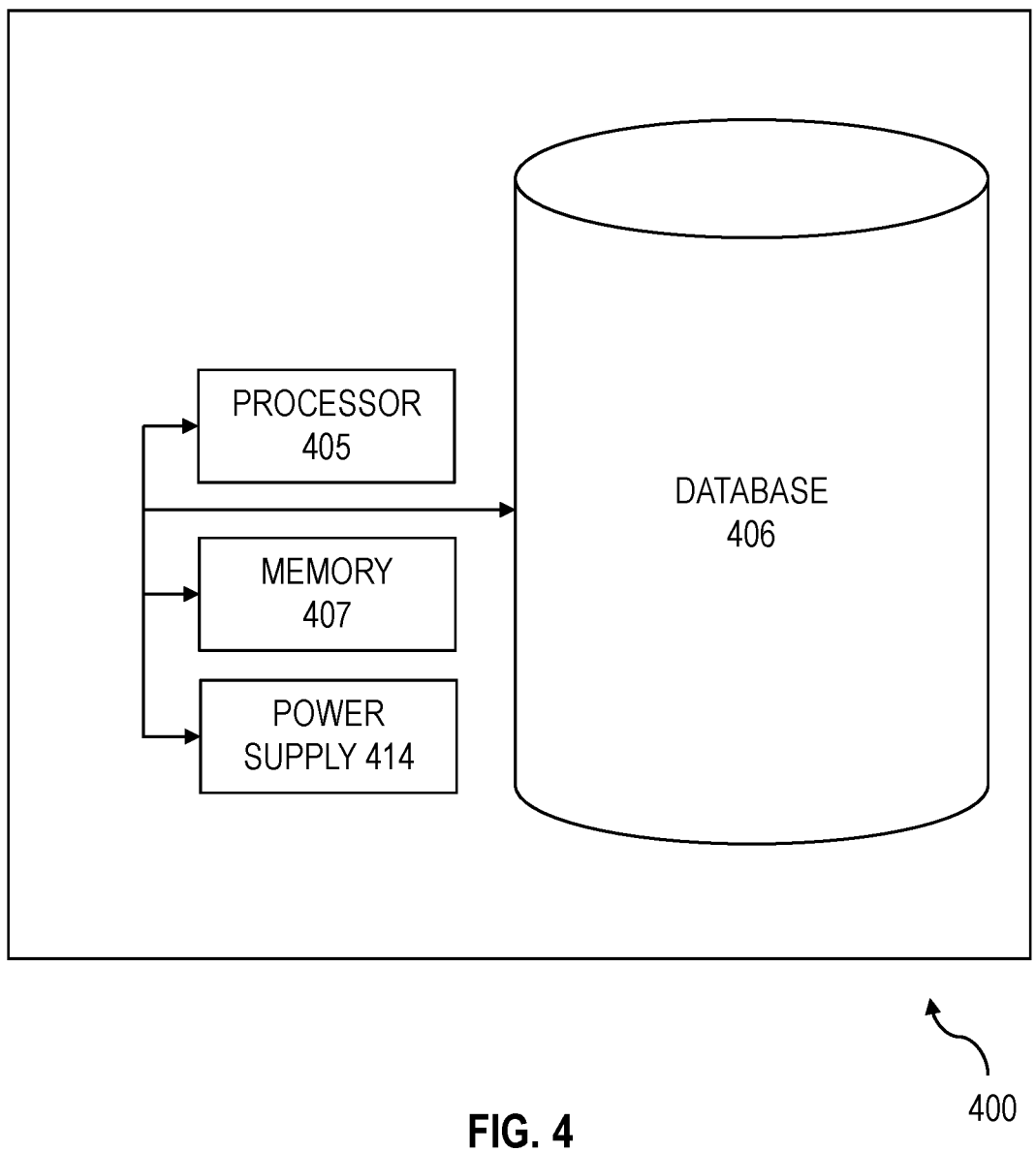
FIG. 4 is a block diagram of an example computer system.

FIG. 4 is a block diagram of an example controller 400 used to provide computational functionalities associated with described algorithms, methods, functions, processes, flows, and procedures, as described in this specification, according to an implementation. For example, each of the surface controller 210 and the downhole controller 250 can be implementations of the controller 400. The illustrated controller 400 is intended to encompass any computing device such as a server, desktop computer, laptop/notebook computer, one or more processors within these devices, or any other processing device, including physical or virtual instances (or both) of the computing device. Additionally, the controller 400 can include a computer that includes an input device, such as a keypad, keyboard, touch screen, or other device that can accept user information, and an output device that conveys information associated with the operation of the computer 400, including digital data, visual, audio information, or a combination of information.

The controller 400 includes a processor 405. Although illustrated as a single processor 405 in FIG. 4, two or more processors may be used according to particular needs, desires, or particular implementations of the controller 400. Generally, the processor 405 executes instructions and manipulates data to perform the operations of the controller 400 and any algorithms, methods, functions, processes, flows, and procedures as described in this specification.

The controller 400 can also include a database 406 that can hold data for the controller 400 or other components (or a combination of both) that can be connected to the network. Although illustrated as a single database 406 in FIG. 4, two or more databases (of the same or combination of types) can be used according to particular needs, desires, or particular implementations of the controller 400 and the described functionality. While database 406 is illustrated as an integral component of the controller 400, database 406 can be external to the controller 400.

The controller 400 includes a memory 407 that can hold data for the controller 400 or other components (or a combination of both) that can be connected to the network. Although illustrated as a single memory 407 in FIG. 4, two or more memories 407 (of the same or combination of types) can be used according to particular needs, desires, or particular implementations of the controller 400 and the described functionality. While memory 407 is illustrated as an integral component of the controller 400, memory 407 can be external to the controller 400. The memory 407 can be a transitory or non-transitory storage medium.

The memory 407 stores controller-readable instructions executable by the processor 405 that, when executed, cause the processor 405 to perform operations, such as processing the buffer string at step 308 of method 300 to determine whether the buffer string contains a message that is valid. The controller 400 can also include a power supply 414. The power supply 414 can include a rechargeable or non-rechargeable battery that can be configured to be either user- or non-user-replaceable. The power supply 414 can be hard-wired. There may be any number of controllers 400 associated with, or external to, a computer system containing controller 400, each controller 400 communicating over the network. Further, the term "client," "user," "operator," and other appropriate terminology may be used interchangeably, as appropriate, without departing from this specification. Moreover, this specification contemplates that many users may use one controller 400, or that one user may use multiple controllers 400.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A method comprising:
receiving, at a surface location, a signal wirelessly transmitted at a first frequency from a downhole controller disposed within a wellbore;
demodulating the received signal to a demodulated digital value;
adding the demodulated value to an end of a buffer string;
processing the buffer string to determine whether the buffer string contains a message that is valid, wherein processing the buffer string comprises:
extracting a cyclic redundancy check field string and an auxiliary field string from the buffer string;
determining that the auxiliary field string translates to a first valid state of a plurality of valid states, wherein at least one of the plurality of valid states is a RUN IN HOLE state associated with a predetermined bit string length of 21 bits;
in response to determining that the auxiliary field string translates to the first valid state, determining a respective, predetermined bit string length associated with the first valid state;
in response to determining the respective, predetermined bit string length associated with the first valid state, calculating a checksum of a portion of the buffer string having the respective, predetermined bit string length associated with the first valid state; and
determining that the calculated checksum matches the cyclic redundancy check field string; and
in response to determining that the buffer string contains the message that is valid, decoding the message.

2. The method of claim 1, comprising wirelessly transmitting a command signal at a second frequency different from the first frequency to the downhole controller to adjust a state of the downhole controller.

3. The method of claim 1, wherein decoding the message comprises, in response to determining that the calculated checksum matches the cyclic redundancy check field string, decoding the portion of the buffer string into the message.

4. The method of claim 3, comprising storing the message in a storage medium and emptying the buffer string in response to decoding the message.

5. The method of claim 4, comprising displaying the message at a surface location.

6. The method of claim 4, wherein at least one of the plurality of valid states is a TRACTOR state associated with a predetermined bit string length of 47 bits.

7. The method of claim 4, wherein at least one of the plurality of valid states is a CIRCULATE state associated with a predetermined bit string length of 50 bits.

8. A system comprising:
a downhole controller configured to be disposed within a wellbore, the downhole controller comprising:
a downhole processor; and
a downhole computer-readable storage medium coupled to the downhole processor and storing programming instructions for execution by the downhole processor, the programming instructions instructing the downhole processor to perform operations comprising wirelessly transmitting, at a first frequency, a signal representing a state of the downhole controller; and
a surface controller communicatively coupled to the downhole controller, the surface controller comprising:
a surface processor; and
a surface computer-readable storage medium coupled to the surface processor and storing programming instructions for execution by the surface processor, the programming instructions instructing the surface processor to perform operations comprising:
receiving the signal from the downhole controller;
demodulating the signal to a demodulated digital value;
appending the demodulated digital value to a buffer string;
processing the buffer string to determine whether the buffer string contains a message that is valid, wherein processing the buffer string comprises:
extracting a cyclic redundancy check field string and an auxiliary field string from the buffer string;
determining that the auxiliary field string translates to a first valid state of a plurality of valid states, wherein at least one of the plurality of valid states is a TRACTOR state associated with a predetermined bit string length of 47 bits;
in response to determining that the auxiliary field string translates to the first valid state, determining a respective, predetermined bit string length associated with the first valid state;
in response to determining the respective, predetermined bit string length associated with the first valid state, calculating a checksum of a portion of the buffer string having the respective, predetermined bit string length associated with the first valid state; and
determining that the calculated checksum matches the cyclic redundancy check field string; and
in response to determining that the buffer string contains the message that is valid, decoding the message.

9. The system of claim 8, wherein the programming instructions stored by the surface computer-readable storage medium instructs the surface processor to perform operations comprising, in response to determining that the buffer string contains the message that is valid, wirelessly transmitting, at a second frequency different from the first frequency, a command signal to the downhole controller to adjust the state of the downhole controller.

10. The system of claim 8, wherein decoding the message comprises, in response to determining that the calculated checksum matches the cyclic redundancy check field string, decoding the portion of the buffer string into the message.

11. The system of claim 10, wherein the programming instructions stored by the surface computer-readable storage medium instructs the surface processor to perform operations comprising:

in response to decoding the message, storing the message in the surface computer-readable storage medium;
displaying the message at a surface location; and
emptying the buffer string.

12. The system of claim 11, wherein at least one of the plurality of valid states is a RUN IN HOLE state associated with a predetermined bit string length of 21 bits.

13. The system of claim 11, wherein at least one of the plurality of valid states is a CIRCULATE state associated with a predetermined bit string length of 50 bits.

14. A system comprising:
a bottomhole assembly configured to be disposed within a wellbore, the bottomhole assembly comprising a downhole controller comprising:
a downhole processor; and
a downhole computer-readable storage medium coupled to the downhole processor and storing programming instructions for execution by the downhole processor, the programming instructions instructing the downhole processor to perform operations comprising:
wirelessly transmitting, at a first frequency, a signal representing a state of the bottomhole assembly; and
adjusting the state of the bottomhole assembly in response to receiving a command signal; and
a surface controller communicatively coupled to the downhole controller, the surface controller comprising:
a surface processor; and
a surface computer-readable storage medium coupled to the surface processor and storing programming instructions for execution by the surface processor, the programming instructions instructing the surface processor to perform operations comprising:
receiving the signal from the downhole controller;
demodulating the signal to a demodulated digital value;
appending the demodulated digital value to a buffer string;
processing the buffer string to determine whether the buffer string contains a message that is valid, wherein processing the buffer string comprises:
extracting a cyclic redundancy check field string and an auxiliary field string from the buffer string;
determining that the auxiliary field string translates to a first valid state of a plurality of valid states, wherein at least one of the plurality of valid states is a CIRCULATE state associated with a predetermined bit string length of 50 bits;
in response to determining that the auxiliary field string translates to the first valid state, determining a respective, predetermined bit string length associated with the first valid state;
in response to determining the respective, predetermined bit string length associated with the first valid state, calculating a checksum of a portion of the buffer string having the respective, predetermined bit string length associated with the first valid state; and
determining that the calculated checksum matches the cyclic redundancy check field string; and
in response to determining that the buffer string contains the message that is valid, decoding the message.

15. The system of claim 14, wherein the programming instructions stored by the surface computer-readable storage medium instructs the surface processor to perform operations comprising:
in response to decoding the message, storing the message in the surface computer-readable storage medium;
displaying the message at a surface location;
emptying the buffer string; and
wirelessly transmitting, at a second frequency different from the first frequency, the command signal to the downhole controller to control the bottomhole assembly.

* * * * *